April 14, 1970  T. M. DAVISON  3,506,957
STRONG MOTION RECORDER USING VELOCITY GEOPHONE
Filed June 28, 1968  4 Sheets-Sheet 1

THOMAS M. DAVISON
INVENTOR.

BY William E. Johnson Jr
ATTORNEY.

THOMAS M. DAVISON
INVENTOR.

BY William E. Johnson Jr.
ATTORNEY

THOMAS M. DAVISON
INVENTOR.

United States Patent Office 3,506,957
Patented Apr. 14, 1970

3,506,957
STRONG MOTION RECORDER USING VELOCITY GEOPHONE
Thomas M. Davison, Houston, Tex., assignor to Dresser Industries, Inc., Dallas, Tex., a corporation of Delaware
Filed June 28, 1968, Ser. No. 740,944
Int. Cl. G01v 1/20, 1/28
U.S. Cl. 340—15.5                6 Claims

ABSTRACT OF THE DISCLOSURE

Three velocity geophones, each having a natural frequency of 21 cycles per second, are orthogonally arranged in an apparatus to measure the earth movements in three planes. The low frequency portion of the response curve of each geophone, rolling off at 18 db/octave, is individually integrated and then coupled through three channels of bi-polar level detection circuitry, providing for either positive or negative polarities. Grating circuits responsive to predetermined g levels of either polarity in any of the three channels cause a recording oscillograph to commence operation. The oscillograph lamp circuitry, having a primary filament and a secondary filament, is responsive to the burning out of the primary filament to cause the secondary filament to be activated. Circuitry is also provided to monitor all of the supply voltages and to activate an alarm should one of the circuits experience failure.

BACKGROUND OF THE INVENTION

This invention relates generally to an apparatus for detecting and recording vibrations, and in particular, to an apparatus having a velocity geophone input for detecting and recording seismic vibrations.

Seismic refraction techniques, which have been widely used in the search for oil beneath the earth's surface, were originally developed to deduce the earth's internal structure from earthquake seismograms. The conventional detecting instruments used in seismic prospecting, both refraction and reflection, evolved directly from the seismometers first developed for recording earthquakes. In as far as is known today, earthquakes originate from fairly localized disturbances within or beneath the crust of the earth, in which large masses of rock yield suddenly by faulting or fracture to long-continued stresses beyond the limit of elastic deformation. Since such falting or fracturing can cause permanent structural damage to the buildings located in the area of an earthquake, there has arisen a need for a relatively inexpensive, reliable earth quake detector and recorder apparatus which can be permanently installed within or near buildings which are known to be within earthquake belts, for example, along the Pacifiic Coast of California. Furthermore, due to the unexpected, sudden nature of earthquakes, such an apparatus should be automatically responsive to tremors exceeding predetermined levels.

As with any seismogram apparatus, the primary purpose of an earthquake recorder is to obtain a record of ground motion, be it a record of displacement, velocity or acceleration. However, in attempting to ascertain the forces of an earthquake which could result in structural damage to buildings, the acceleration factor is all important. It should be appreciated that even though mathematical relationships exist between displacement, velocity and acceleration, the circuitry involved in determining the true acceleration from either displacement or velocity measurements alone is quite burdensome and complex, and often produces inaccuracies.

Furthermore, conventional earthquake recorders have heretofore been either mechanical devices or have been extremely complex electronic devices using an accelerometer as an input to the system.

It is therefore the primary object of this invention to provide an improved apparatus for detecting and recording earthquakes;

It is another object of the invention to provide in an apparatus for detecting and recording earthquakes having automatic response characteristics;

It is still another object of the invention to provide an earthquake detection apparatus having improved reliability characteristics; and It is yet another object of the invention to provide an earthquake detection apparatus which supplies acceleration information without the use of an accelerometer.

The objects of the invention are accomplished, broadly, by the provision of an apparatus having one or more velocity geophones and associated electronic circuitry which utilizes the low frequency roll-off characteristics of such geophones to indicate acceleration; the apparatus being automatically responsive to earthquake forces exceeding a predetermined level. Means are also provided in the apparatus, through the use of filament current sensing devices and switching arrangements, to improve the reliability of the apparatus despite the movements experienced by the apparatus.

These and other objects, features and advantages of the invention will be more fully appreciated and apparent from the following detailed description and which is illustrated in the drawings, in which:

FIGURE 1 is a block diagram of the electronic circuitry used with three geophones arranged in three coordinates according to the invention;

FIGURE 2 schematically illustrates a bi-polar signal detection circuit according to the invention;

FIGURE 3 schematically illustrates dual polarity gating circuitry according to the invention;

FIGURE 4 schematically illustrates circuitry according to the invention providing trouble detection and filament current sensing switching means;

Figure 1:
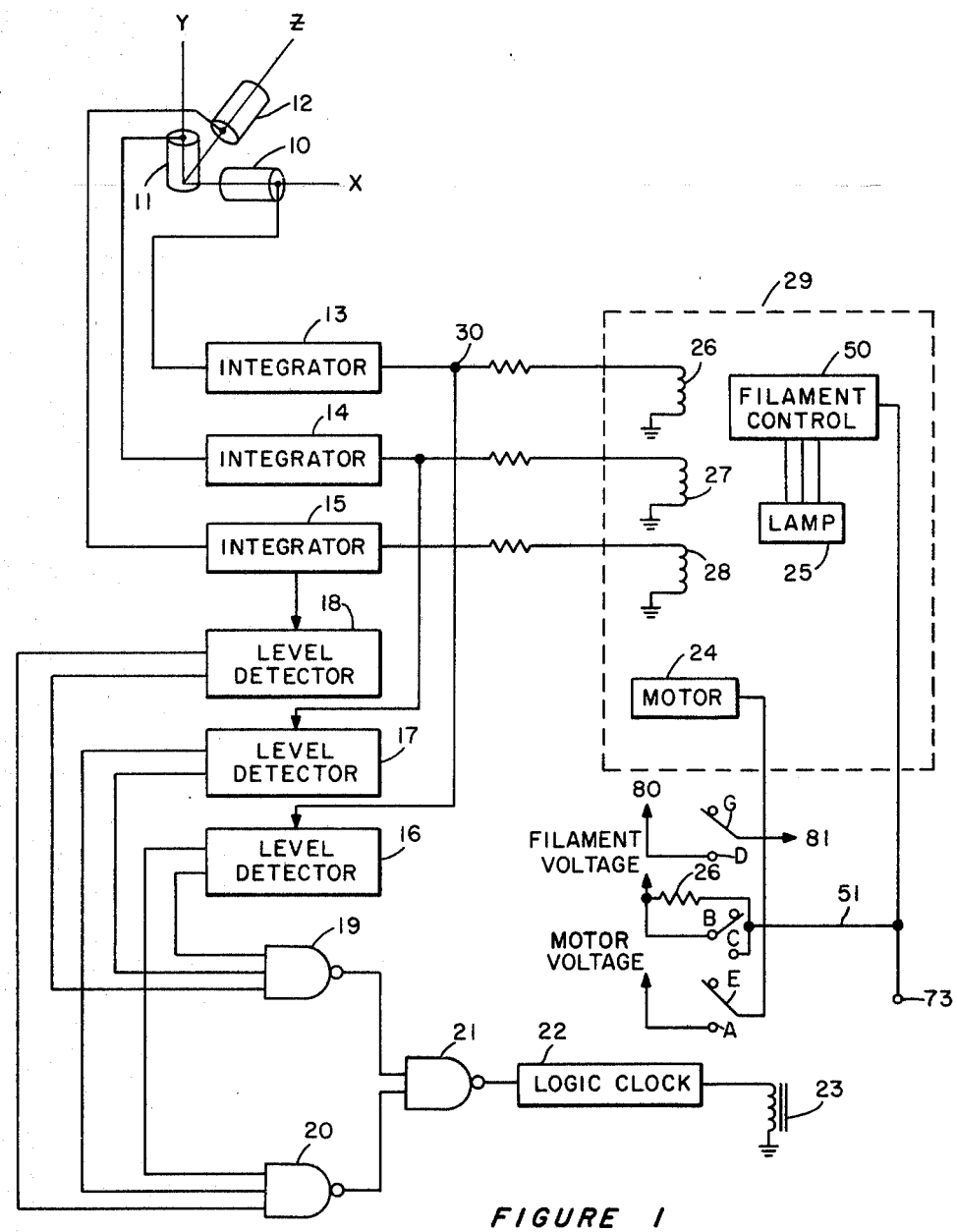

Referring now to the drawing in detail, especially to FIGURE 1, there is illustrated three seismic velocity geophones 10, 11, and 12 arranged in the orthogonal plane of x, y and z, respectively. Each of the geophones has a natural frequency of 21 cycles per second to utilize the normalized 12 db/octave roll-off characteristic in the region of 1–15 cycles per second, as will be explained in more detail hereinafter. The outputs of the geophones 10, 11 and 12 are respectively connected to the conventional integrator circuits 13, 14 and 15, the outputs of which are connected, respectively, to the level detector circuits 16, 17 and 18 which are described in more detail with respect ot FIGURE 2.

Figure 3:
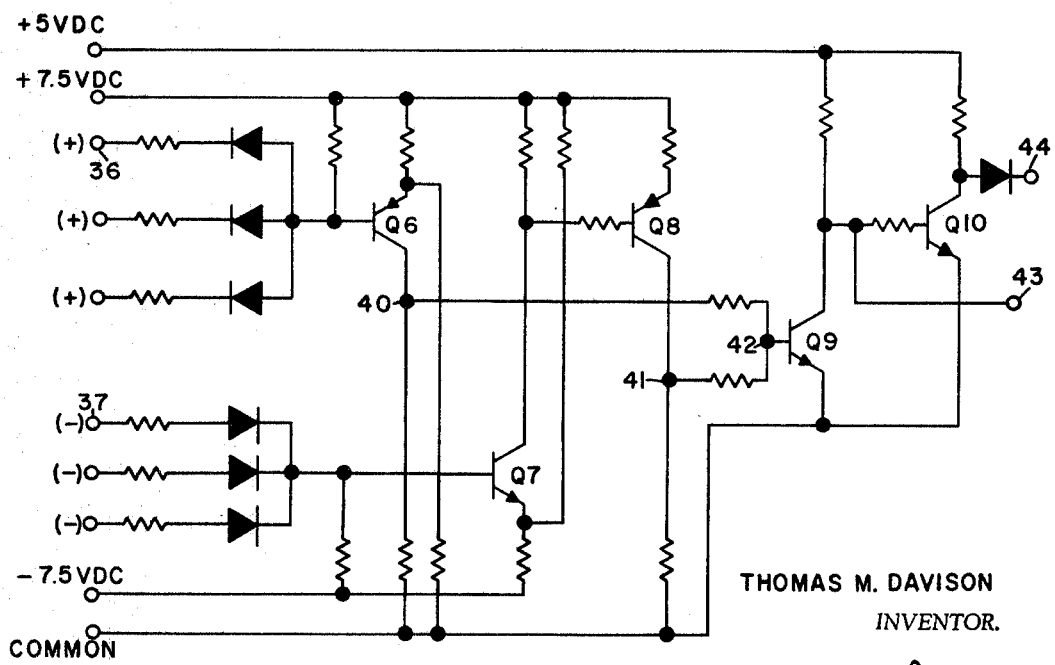

Further in FIGURE 1, the dual outputs of the level detectors are connected to the "OR" gates 19 and 20, the outputs of which are connected into another "OR" gate 21, the "OR" gates 19, 20 and 21 being described in more detail with respect to FIGURE 3.

The output of "OR" gate 21 drives a conventional logic clock 22 which could be, for example, a series of J–K flip-flops, to cause the relay 23 to be activated. Although those skilled in the art will recognize that any number of timing sequences can be used with such a logic clock, the recorder apparatus according to the preferred embodiment was designed to record for six seconds beyond the expiration of the last signal which exceeds the predetermined threshold level. Thus, for example, six seconds after the last signal from gate 21 is delivered to the logic clock 22, the coil of the relay 23 is de-energized and the recorder is cut off.

The contact A of relay 23 is connected to the motor voltage necessary to run the oscillograph motor 24, for example, 12 volts D.C., the wiper arm E of the relay 23 being connected to the motor. The wiper arm B of relay 23 is connected to the voltage necessary to activate the filaments in the oscillograph lamp 25, for example, 12 volts D.C. The contact C is connected through resistor 26, for example, 75 ohms, to the filament voltage to provide a stand-by or reduced current to the filaments whenever the relay 23 is de-energized, contact C of the relay 23 also being connected to the filaments of the lamp. The contact D and wiper arm G of relay 23 are used in connection with the circuitry in FIGURE 4 and will be described in more detail hereinafter.

Further in FIGURE 1, the outputs of the integrator circuits 13, 14 and 15 are connected, respectively, to the recording galvanometers 26, 27 and 28 located within the oscillograph 29, along with the lamp 25, the motor 24 and related circuitry.

Although the oscillograph 29 is illustrated only in block diagram, it should be appreciated that it is, for the most part, conventional, in that it has a drive motor 24, the recording galvanometers, the recording paper (not illustrated), and the lamp 25 for selectively exposing the recording paper.

Figure 2:
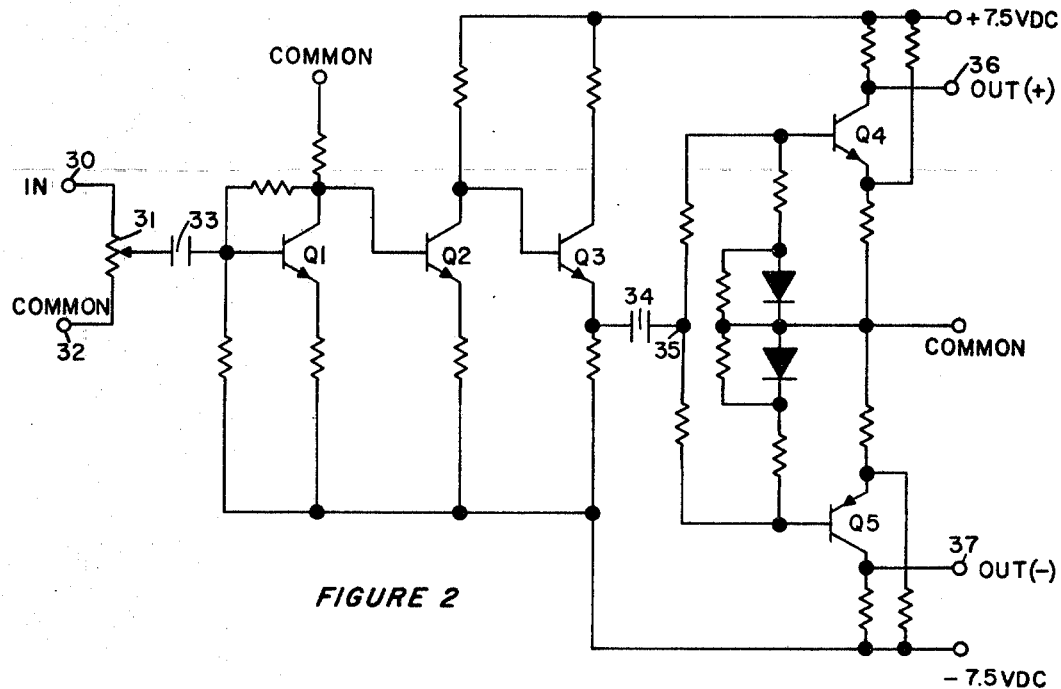

In FIGURE 2 there is illustrated one of the bi-polar level detector circuits, for example, level detector 16. The input terminal 30 is connected through the variable resistor 31 to the signal common terminal 32, thus providing a means for setting the threshold level of the detector circuit. The wiper arm of resistor 30 couples the signal through capacitor 33 to a pair of cascaded transistor amplifier stages, $Q_1$ and $Q_2$, respectively. The output of $Q_2$, taken from its collector terminal, drives the base of the emitter follower transistor stage $Q_3$. The output of the stage $Q_3$ is coupled through capacitor 34 to drive the respective bases of the transistor amplifier stages $Q_4$ and $Q_5$. It should be appreciated that because the $Q_4$ stage has an NPN transistor and the $Q_5$ stage has PNP transistor, the two stages $Q_4$ and $Q_5$, being biased as illustrated, operate upon the signal appearing at junction 35 to produce a positive output from terminal 36 or a negative output from terminal 37 as dictated by the polarity of the signal at junction 35. Thus, a positive signal causes a positive output at terminal 36, whereas a negative signal at terminal 35 causes a negative output at terminal 37. Since the transistors are normally biased in a saturated or "full-on" condition, the input signal turns the respective transistor off and causes its collector to approach the collector supply voltage, which is either +7.5 volts or −7.5 volts in the preferred embodiment.

FIGURE 3 illustrates gating circuitry which is responsive to the dual outputs of the three channels from the three geophones. The three positive terminals, exemplified by terminal 36, are respectively coupled through a resistor and a rectifier to drive the base of the transistor amplifier stage $Q_6$. Thus, the circuit described so far operates on an "OR" gate, and if a signal appears at any of the positive terminals, the transistor $Q_4$ is turned on and a signal will appear at its collector terminal 40. Conversely, if a negative signal appears at any of the three negative terminals, exemplified by terminal 37, the base of the transistor stage $Q_7$ is driven to turn $Q_7$ on, which in turn drives the base of transistor stage $Q_8$. The output from transistor $Q_8$ is taken from its collector terminal 41. Thus, if a signal appears at any one or more of the positive terminals or any one or more of the negative terminals, the signals appearing at terminals 40 or 41 are coupled, respectively, through a resistor to terminal 42 which drives the base of transistor $Q_9$. The output of transistor $Q_9$ can be taken from the terminal 43 to drive the logic clock 22 of FIGURE 1, or from terminal 44 from the additional stage $Q_{10}$ if desired to drive remote starting equipment (not illustrated). Thus, to relate the circuitry of FIGURE 3 to that of FIGURE 1, it should be appreciated that the "OR" gates 19 and 20 correspond, respectively, to the two sets of three rectifiers, to transistor $Q_6$ for one "OR" gate and to transistors $Q_7$ and $Q_8$ for the other "OR" gate. Likewise, "OR" gate 21 corresponds to the transistor stage $Q_9$.

Thus, there has been described circuitry which causes the relay coil 23 to be activated any time a signal of either polarity of a predetermined amplitude appears at the output of any of the three integrator circuits 13, 14, or 15.

Referring again to FIGURE 1, in the operation of the circuitry depicted therein, the activation of the relay 23 causes the motor 24 to commence running, and thus the advancement of the oscillograph film or paper (not illustrated). Likewise, the activation of the relay 23 causes the full filament voltage to be applied to the filament through the filament control circuitry 50, now to be described with respect to FIGURE 4.

Figure 4:
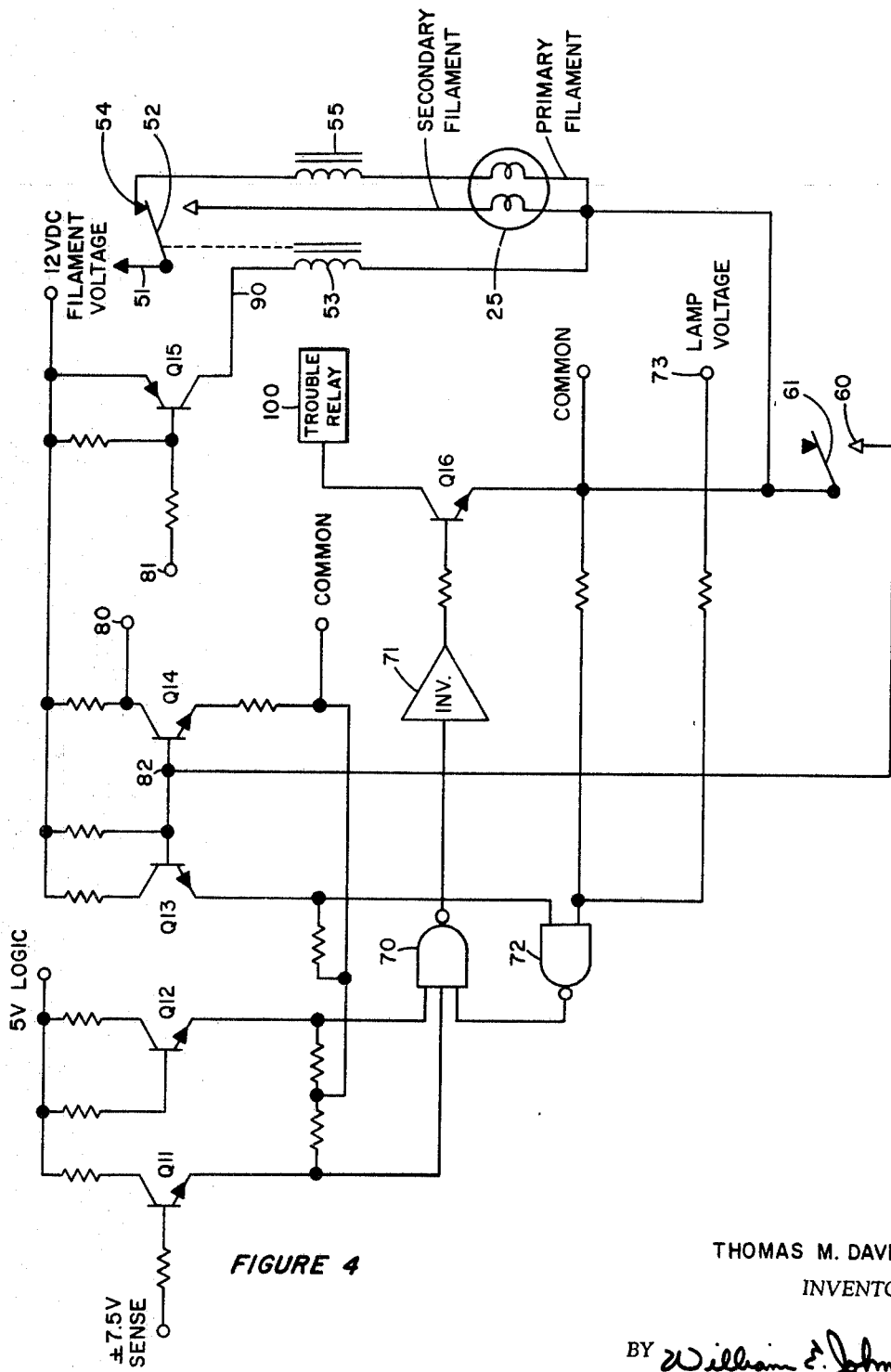

In FIGURE 4 there is illustrated a dual filament oscillograph lamp 25, for example, a general Electric Co. GE–1844, having a primary filament and a secondary filament. The filament voltage is coupled from the contact C of relay 23 (FIGURE 1) along conductor 51 to the wiper arm 52 of the relay 53, which is then supplied through the normally closed contact 54, through the coil of a current sensing relay 55 to the primary filament of the lamp 25. The secondary filament is connected to the normally open contact of relay 53, so that should relay 53 be energized, the full filament voltage, for example, 12 volts D.C., is supplied to the secondary filament. While the primary filament continues to be energized, the normally open contact 60 of relay 55 is connected to the wiper arm 61, which in turn is connected to signal common, the effect of which is described hereinafter.

Also illustrated in FIGURE 4 are five transistor stages, being respectively identified as $Q_{11}$, $Q_{12}$, $Q_{13}$, $Q_{14}$ and $Q_{15}$. $Q_{11}$ and $Q_{12}$ are emitter follower stages, the outputs of which are coupled into the conventional "NAND" gate 70 to provide a means for monitoring the +5 volt and ±7.5 volt power supplies used in the apparatus. "NAND" gate 72, having the terminal 73 as one input, terminal 73 serving as a monitor of the filament voltage (illustrated better in FIGURE 1) and the emitter terminal of $Q_{13}$ as another input, is used to furnish a logic "1" to the input of the "NAND" gate 70 whenever the primary filament is intact.

During standby, that is, before the full filament voltage is applied, a logic zero is held on one input of "NAND" gate 72 because the voltage across the primary filament (referred to in FIGURE 4 as lamp voltage) is quite low. At the same time a logic "1" is applied to another input of "NAND" gate 72 by transistor $Q_{13}$ which is saturated in standby. Thus, in standby condition, a "1" is maintained at the output of "NAND" gate 72 by the logic zero on the gate input caused by the low voltage at terminal 73. If the primary filament should open, the voltage at terminal 73 becomes high, thus causing a logic "1" to appear at its "NAND" gate input. Since the other input (from $Q_{13}$) always has a logic "1" in standby, a logic zero will appear on the output causing gate 70's output to be "1" and inverter 71's output to be a logic zero, thus cutting off transistor $Q_{16}$ and dropping out the trouble relay 100. Trouble relay 100 could be any suitable relay or alarm system indicative of system malfunction.

During energized operation, as opposed to standby, the trouble relay is held energized if the primary filament is intact by a transfer of the logic zero from one input to the other of gate 72. Terminal 73, being the voltage across the primary filament, goes high causing a "1" to appear on this input of gate 72. However, the filament sensing relay 55 is energized by the current through the primary filament 25, thus causing the base of transistor $Q_{13}$ to be grounded. This cuts off $Q_{13}$ and causes a logic "0" to appear at the other input of gate 72.

In this manner, a logic "1" is maintained on the output of gate 72 and the trouble relay remains energized. Should the primary filament break during operation, however, the current sensing relay 55 will de-energize and allow $Q_{13}$ to resaturate. This causes a logic "1" to be present on both inputs of gate 72, thus causing the trouble relay to de-energize. It should be appreciated that de-energization of the trouble relay can be indicated by means well-known in the art, for example, by red lights, audible alarms or the like.

The transistor stages $Q_{13}$, $Q_{14}$ and $Q_{15}$ also serve to monitor the filament current as detected by the coil of relay 55. Whenever relay 23 of FIGURE 1 is energized, terminals 80 and 81 are connected together. Likewise, whenever relay 55 is energized, indicating that the primary filament is drawing current, terminal 82 is connected to signal common. Whenever terminal 82 is not common, meaning that the primary filament is defective, the output of transistor $Q_{14}$ drives the base of $Q_{15}$ to drive $Q_{15}$ into saturation, thus causing almost the entire 12 volts D.C. to be supplied along conductor 90 to the coil of the relay 53, which in turn causes the filament voltage to be switched to the secondary filament.

Figure 5:
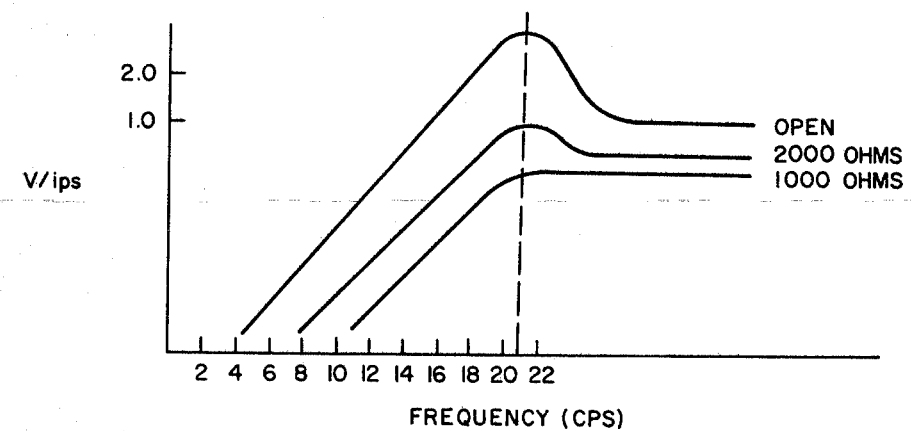
FIGURE 5 illustrates graphically the response curve of a velocity geophone.

In FIGURE 5 there is illustrated a set of typical response curves of a velocity geophone having a natural frequency of 21 cycles per second, the difference in the curves being a function of shunt resistance which is used for desired damping. However, despite the fact that a change in the shunt resistance causes a translation of the response curve, the curve nonetheless, after being normalized, is observed to roll-off at 12 db/octave below its natural frequency. It should be appreciated that the velocity geophone characteristic actually rolls off at 18 db/octave. By illustrating (normalizing) the vertical coordinate as v./i.p.s. (volts/inch per second), the curve has a 12 db/octave roll-off in the region of interest. The geophones used in the apparatus according to the present invention were chosen to have natural frequencies of 21 cycles per second because most of the earthquake tremors of interest fall within the 1–15 cycles per second range, thus coming within the normalized 12 db/octave roll-off region. However, it should be appreciated that geophones having other natural frequencies nonetheless are observed to exhibit the 12 db/octave low frequency roll-off. Thus, for example, if one were interested in the region of 20–30 cycles per second, a geophone having a natural frequency higher than 30 cycles per second, for example, 35 to 40 cycles per second, would provide the means for making such a measurement in conjunction with the circuitry described herein. One of the unique features involved in using the low frequency roll-off portions of a velocity geophone resides in the fact that this portion is usually filtered out or discarded in prior art systems.

The characteristics of the low frequency roll-off portion of a velocity geophone, in conjunction with the electronic circuitry described herein, can best be understood by reference to the following table:

| | | | Slope |
|---|---|---|---|
| (1) Function | Displacement | D | 0 |
| (2) First derivative | Velocity | $V = D/T$ | 6 DB |
| (3) Second derivative | Acceleration | $a = \dfrac{D}{T^2}$ | 12 DB |
| (4) Third derivative | | $\dfrac{da}{dt} = \dfrac{-2D}{T^3}$ | 18 DB |
| (5) Integral of third derivative | Acceleration | $\int \dfrac{da}{dt} = \int \dfrac{-2d}{T_3} = D/T^2$ | 12 DB |

In the consideration of line (2), it should be appreciated that the characteristic responsive curve of a velocity geophone increases at 6 db/octave above the natural frequency, for constant displacement. In FIGURE 5, however, with exponentially decaying displacement, the level remains constant for increasing frequency. Further in line (2), the first derivative of velocity is acceleration, so therefore, if the output of a velocity geophone is coupled into a first derivative operational amplifier, the resultant would be acceleration. However, because of noise and accuracy problems, such an approach is unsatisfactory. It has been found, quite unexpectedly, that the low frequency roll-off portions of the velocity geophone is representative of the second derivative velocity equation (the third derivative of displacement) indicated on line (4) of the table. Further, by integrating the third derivative of displacement, the resultant output is also acceleration, thus providing a vastly improved means for monitoring acceleration.

Figure 6:
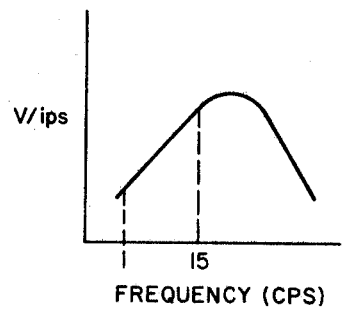
FIGURE 6 illustrates graphically the output curve of a velocity geophone according to the invention.

FIGURE 6 illustrates graphically the output of a velocity geophone having the response characteristic illustrated in FIGURE 5. In the region of 1–15 cycles per second, the output of the velocity geophone is observed to increase 12 db/octave as frequency increases, even as the frequency approaches the natural frequency of the geophone, or 6 db/octave on a normalized basis.

Figure 7:
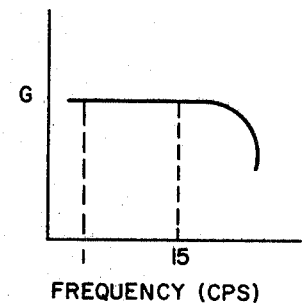
FIGURE 7 illustrates graphically the output curve of the integrator circuitry according to the invention.

FIGURE 7 illustrates graphically the output of one of the integrator circuits 13, 14 and 15 of FIGURE 1 having as its input the output of the velocity geophone according to the invention. Since the integrator response curve (not illustrated) follows a 6 db/octave slope, the integrator circuit effectively flattens out the output from the velocity geophone in the frequency range below the natural frequency of the geophone.

Thus, it should be appreciated that the use of the low frequency roll-off portion of a velocity geophone response curve eliminates the use of an accelerometer and the complex electronic circuitry which normally accompanies such a device. The output of the integrator circuit, being substantially flat in the region of interest, allows the level detectors 16, 17 and 18 to operate with simplified threshold levels, thus providing improved reliability and overall simplicity.

In the overall operation of the system and apparatus illustrated in FIGURE 1, one or more of the geophones 10, 11 and 12, upon detecting a signal in the region of interest, will cause an output signal to appear at one or more of the integrator outputs. This output signal then causes one or more of the recording galvanometers 26, 27 and 28 to be deflected by an amount proportional to the signal. The output signal is also coupled into one of the level detector circuits 16, 17 and 18, and if the signal is strong enough, of either polarity, the recording apparatus is activated, meaning that full filament voltage is applied to the oscillograph lamp and the oscillograph motor commences running. Should the primary filament be defective initially, or should it subsequently burn-out, switching circuitry causes the filament voltage to be applied to the secondary filament, thus providing increased reliability of the apparatus according to the invention.

Thus, it should be appreciated that there has been described herein the preferred embodiment of a new and improved earthquake recording apparatus, one which is automatically responsive to earthquakes of predetermined magnitude, and one which, while being relatively inexpensive, has a high degree of reliability. It should be understood, however, that the present invention is not limited to the specific details of construction and arrangement thereof herein illustrated and that changes and modifications will occur to those skilled in the art without departing from the present invention. For example, while the preferred embodiment of the present invention contemplates the use of three geophones aligned in three mutually perpendicular planes, the principles of the invention can be applied to a single geophone, or even a higher number of geophones than that illustrated.

The embodiments of the invention in which an exclusive property or privilege is claimed are defined as follows:

1. An apparatus for monitoring vibrations of less than twenty-one cycles per second in the earth comprising:
   three velocity geophones mounted in three mutually perpendicular planes, each of said geophones having a natural frequency of twenty-one cycles per second;
   integrating means responsive to the outputs of said geophones, respectively, said integrating means comprising three integrating circuits; and
   means for recording the output of said integrating means.

2. The apparatus according to claim 1 wherein said recording means comprises an oscillograph recorder having an oscillograph lamp having a primary filament and a secondary filament.

3. The apparatus according to claim 2, comprising in addition thereto means for monitoring a function of the condition of said primary filament and for causing said second filament to be activated upon failure of said primary filament.

4. The apparatus according to claim 3 wherein said function of the condition of said primary filament comprises monitoring the electrical current through said primary filament.

5. An apparatus for monitoring vibrations of a given frequency range in the earth comprising:
   a velocity geophone having a natural frequency higher than said given frequency range;
   an integrating circuit responsive to the output of said geophone;
   a level detector circuit responsive to the output of said integrating circuit;
   recording means for recording the output of said integrating circuit; and
   gating means responsive to the output of said level detector circuit for selectively activating said recording means.

6. An apparatus for monitoring vibrations of a given frequency range in the earth comprising:
   three velocity geophones mounted in three mutually perpendicular planes, said geophones each having a natural frequency higher than said given frequency range;
   three integrating circuits respectively responsive to said three geophones;
   three dual-level detector circuits respectively responsive to the outputs of said three integrating circuits, said dual level comprising a first level relating to positive signals and a second level relating to negative signals;
   recording means for recording the outputs of said integrating circuits; and
   gating means responsive to said dual level detector circuits for activating said recording means, whereby said recording means is activated whenever the output of any one of said integrating circuits exceeds a predetermined level of either polarity.

References Cited

UNITED STATES PATENTS 2,927,300  3/1960  Smith _____ 340—15.5

RODNEY D. BENNETT, Jr., Primary Examiner

D. C. KAUFMAN, Assistant Examiner

U.S. Cl. X.R.

73—71.2; 181—.5; 340—261; 346—109